United States Patent
Kleyer et al.

(10) Patent No.: US 6,534,581 B1
(45) Date of Patent: Mar. 18, 2003

(54) SILICONE COMPOSITION AND ELECTRICALLY CONDUCTIVE SILICONE ADHESIVE FORMED THEREFROM

(75) Inventors: Don Lee Kleyer, Hemlock, MI (US); Michael Andrew Lutz, Hope, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/620,397

(22) Filed: Jul. 20, 2000

(51) Int. Cl.$^7$ ............................ C08K 5/05; C08L 83/04; H01B 1/22
(52) U.S. Cl. ................... 524/379; 252/514; 524/379; 524/398; 524/266; 524/268; 524/439; 524/440; 524/588; 524/858; 528/18; 528/34; 528/38
(58) Field of Search ................... 252/514; 524/398, 524/266, 268, 439, 440, 588, 379, 858; 528/18, 34, 38

(56) References Cited

U.S. PATENT DOCUMENTS

| | | | |
|---|---|---|---|
| 2,843,555 A | 7/1958 | Barridge | 260/18 |
| 2,902,467 A | 9/1959 | Chipman | 260/46.5 |
| 2,927,907 A | 3/1960 | Polmanteer | 260/37 |
| 3,065,194 A | 11/1962 | Nitzsche et al. | 260/37 |
| 3,070,559 A | 12/1962 | Nitzsche et al. | 260/18 |
| 3,070,566 A | 12/1962 | Nitzsche et al. | 260/37 |
| 3,127,363 A | 3/1964 | Nitzsche et al. | 260/18 |
| 3,305,502 A | 2/1967 | Lampe | 260/18 |
| 3,575,917 A | 4/1971 | Kapral | 260/33.6 |
| 3,696,090 A | 10/1972 | Lampe | 260/18 |
| 3,702,835 A | 11/1972 | Greenlee | 260/18 |
| 3,769,064 A | 10/1973 | Greenlee | 117/49 |
| 3,888,815 A | 6/1975 | Bessmer et al. | 260/37 |
| 3,933,729 A | 1/1976 | Letoffe | 260/37 |
| 4,054,714 A | 10/1977 | Mastrangelo | 428/328 |
| 4,166,053 A * | 8/1979 | Bossert et al. | |
| 4,302,361 A | 11/1981 | Kotani et al. | 252/503 |
| 4,388,433 A | 6/1983 | Klein et al. | 524/401 |
| 4,490,500 A | 12/1984 | Smith | 524/378 |
| 4,547,529 A | 10/1985 | Lee et al. | 521/122 |
| 4,777,205 A * | 10/1988 | La Scola et al. | |
| 4,962,152 A | 10/1990 | Leempoel | 524/788 |
| 5,015,413 A * | 5/1991 | Nagaoka | |
| 5,217,651 A * | 6/1993 | Nagaoka | |
| 5,227,093 A | 7/1993 | Cole et al. | 252/512 |
| 5,859,105 A | 1/1999 | Nguyen | 524/404 |
| 6,017,587 A * | 1/2000 | Kleyer et al. | |

FOREIGN PATENT DOCUMENTS

| | | | |
|---|---|---|---|
| EP | 0 545 568 A1 | 9/1993 | H01B/1/22 |
| EP | 0816437 A2 | 7/1998 | C08L/83/04 |
| GB | 757074 A2 | 7/1996 | |
| JP | 01-267635 | 10/1989 | |
| JP | 0312896 A8 * | 5/1991 | |
| JP | 647682 A1 | 10/1994 | |
| JP | 757080 A2 | 7/1996 | |
| JP | 8-302196 | 11/1996 | C08L/83/04 |

* cited by examiner

Primary Examiner—Robert Dawson
Assistant Examiner—Marc S Zimmer
(74) Attorney, Agent, or Firm—Larry A. Milco; Catherine U. Brown

(57) ABSTRACT

A silicone composition for preparing a silicone adhesive, the composition prepared by mixing (A) an organopolysiloxane containing an average of at least two silicon-bonded hydroxy groups per molecule; (B) a crosslinking agent in an amount sufficient to cure the composition; wherein the agent is selected from (i) at least one silane having the formula $R^2{}_n SiX_{4-n}$ wherein each $R^2$ is independently selected from monovalent hydrocarbon and monovalent halogenated hydrocarbon groups having from 1 to about 8 carbon atoms, n is 0 or 1, and X is —$OR^2$ or —$OCH_2CH_2OR^2$; (ii) a partial hydrolyzate of (i), and (iii) mixtures comprising (i) and (ii); (C) an electrically conductive filler in an amount sufficient to impart electrical conductivity to the silicone adhesive, wherein the filler comprises particles having at least an outer surface of a metal selected from the group consisting of silver, gold, platinum, palladium, and alloys thereof; (D) an effective amount of a hydroxy-functional organic compound having a molecular weight up to about 1000 and containing at least one hydroxy group per molecule, provided the compound does not substantially inhibit cure of the composition; and (E) a catalytic amount of a condensation catalyst comprising a metal salt of a carboxylic acid. A silicone adhesive and a multi-part curable silicone composition.

36 Claims, No Drawings

SILICONE COMPOSITION AND ELECTRICALLY CONDUCTIVE SILICONE ADHESIVE FORMED THEREFROM

FIELD OF THE INVENTION

The present invention relates to a curable silicone composition for preparing a silicone adhesive and more particularly to a condensation-curable silicone composition containing an electrically conductive filler and a hydroxy-functional organic compound. The present invention also relates to an electrically conductive silicone adhesive produced from such composition.

BACKGROUND OF THE INVENTION

Silicone adhesives are useful in a variety of applications by virtue of their unique combination of properties, including high thermal stability, good moisture resistance, excellent flexibility, high ionic purity, low alpha particle emissions, and good adhesion to various substrates. For example, silicone adhesives are widely used in the automotive, electronic, construction, appliance, and aerospace industries.

Condensation-curable silicone compositions comprising an organopolysiloxane containing silicon-bonded hydroxy groups, a crosslinking agent, and a curing catalyst are known in the art. Illustrative of such compositions are U.S. Pat. Nos. 3,769,064; 2,902,467; 2,843,555; 2,927,907; 3,065,194; 3,070,559; 3,127,363; 3,070,566; 3,305,502; 3,575,917; 3,696,090; 3,702,835; 3,888,815; 3,933,729; 4,388,433; 4,490,500; 4,547,529; 4,962,152; and European Patent Application No. 0816437A2. However, the aforementioned references do not teach the electrically conductive filler and the hydroxy-functional organic compound of the present invention.

Furthermore, Japanese Laid-Open Patent Application (Kokai) No. 8-302196 to Fujiki et al. discloses a silicone composition comprising a silanol group-containing organopolysiloxane, a hydrolysable organosilicon compound, a conductive filler composed of silver particles or silver-covered particles surface-treated with a silicone compound, and a curing catalyst. However, the preceding patent application does not teach the hydroxy-functional organic compound of the present invention.

SUMMARY OF THE INVENTION

The present inventors have discovered that a condensation-curable silicone composition containing an electrically conductive filler and a hydroxy-functional organic compound cures to form an adhesive having unexpectedly superior electrical conductivity. Specifically, the present invention is directed to a curable silicone composition for preparing a silicone adhesive, the composition prepared by mixing:

(A) an organopolysiloxane containing an average of at least two silicon-bonded hydroxy groups per molecule;

(B) a crosslinking agent in an amount sufficient to cure the composition; wherein the agent is selected from (i) at least one silane having the formula $R^2_n SiX_{4-n}$ wherein each $R^2$ is independently selected from monovalent hydrocarbon and monovalent halogenated hydrocarbon groups having from 1 to about 8 carbon atoms, n is 0 or 1, and X is $-OR^2$ or $-OCH_2CH_2OR^2$; (ii) a partial hydrolyzate of (i), and (iii) mixtures comprising (i) and (ii);

(C) an electrically conductive filler in an amount sufficient to impart electrical conductivity to the silicone adhesive, wherein the filler comprises particles having at least an outer surface of a metal selected from the group consisting of silver, gold, platinum, palladium, and alloys thereof;

(D) an effective amount of a hydroxy-functional organic compound having a molecular weight up to about 1000 and containing at least one hydroxy group per molecule, provided the compound does not substantially inhibit cure of the composition; and (E) a catalytic amount of a condensation catalyst comprising a metal salt of a carboxylic acid.

The present invention is also directed to a silicone adhesive comprising a reaction product of the above-described composition.

The present invention is further directed to a multi-part curable silicone composition comprising components (A) through (E) in two or more parts, provided neither component (A) nor component (D), are present with components (B) and (E) in the same part.

The silicone composition of the present invention has numerous advantages, including good flow, low VOC (volatile organic compound) content, and adjustable cure. Moreover, the present silicone composition cures to form a silicone adhesive having good adhesion and unexpectedly superior electrical conductivity as evidenced by low contact resistance and/or volume resistivity.

The silicone composition of the present invention is useful for preparing an electrically conductive silicone adhesive. The silicone adhesive of the present invention has numerous uses, including die attach adhesives, solder replacements, and electrically conductive coatings and gaskets. In particular, the silicone adhesive is useful for bonding electronic components to flexible or rigid substrates.

These and other features, aspects, and advantages of the present invention will become better understood with reference to the following description and appended claims.

DETAILED DESCRIPTION OF THE INVENTION

The present invention is directed to a curable silicone composition for preparing a silicone adhesive, the composition prepared by mixing:

(A) an organopolysiloxane containing an average of at least two silicon-bonded hydroxy groups per molecule;

(B) a crosslinking agent in an amount sufficient to cure the composition; wherein the agent is selected from (i) at least one silane having the formula $R^2_n SiX_{4-n}$ wherein each $R^2$ is independently selected from monovalent hydrocarbon and monovalent halogenated hydrocarbon groups having from 1 to about 8 carbon atoms, n is 0 or 1, and X is $-OR^2$ or $-OCH_2CH_2OR^2$; (ii) a partial hydrolyzate of (i), and (iii) mixtures comprising (i) and (ii);

(C) an electrically conductive filler in an amount sufficient to impart electrical conductivity to the silicone adhesive, wherein the filler comprises particles having at least an outer surface of a metal selected from the group consisting of silver, gold, platinum, palladium, and alloys thereof;

(D) an effective amount of a hydroxy-functional organic compound having a molecular weight up to about 1000 and containing at least one hydroxy group per molecule, provided the compound does not substantially inhibit cure of the composition; and (E) a catalytic amount of a condensation catalyst comprising a metal salt of a carboxylic acid.

Component (A) of the present invention also referred to herein as the "polymer," is at least one organopolysiloxane containing an average of at least two silicon-bonded hydroxy groups (silanol groups) per molecule. The structure of the organopolysiloxane can be linear, branched, or resinous. The organopolysiloxane can be a homopolymer or a copolymer. The silicon-bonded organic groups in the organopolysiloxane are independently selected from monovalent hydrocarbon and monovalent halogenated hydrocarbon groups. These monovalent groups typically have from 1 to about 20 carbon atoms, preferably from 1 to 10 carbon atoms, and are exemplified by, but not limited to alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least 50 percent, and more preferably at least 80%, of the organic groups in the organopolysiloxane are methyl.

The viscosity of the organopolysiloxane at 25° C., which varies with molecular weight and structure, is typically from 0.05 to 200 Pa·s, preferably from 2 to 100 Pa·s, and more preferably from 5 to 50 Pa·s.

A preferred organopolysiloxane according to the present invention is a hydroxy-terminated polydiorganosiloxane having the general formula $HOR^1_2SiO(R^1_2SiO)_mSiR^1_2OH$ wherein each $R^1$ is independently selected from monovalent hydrocarbon and monovalent halogenated hydrocarbon groups, as defined above; and subscript m has a value such that the viscosity of the polydiorganosiloxane at 25° C. is from 0.05 to 200 Pa·s. Preferably, $R^1$ is methyl.

Examples of organopolysiloxanes useful in the silicone composition of the present invention include, but are not limited to polydiorganosiloxanes having the following formulae: $HOMe_2SiO(Me_2SiO)_mSiMe_2OH$, $HOMe_2SiO(Me_2SiO)_{0.25m}(MePhSiO)_{0.75m}SiMe_2OH$, $HOMe_2SiO(Me_2SiO)_{0.95m}(Ph_2SiO)_{0.05m}SiMe_2OH$, $HOMe_2SiO(Me_2SiO)_{0.98m}(MeViSiO)_{0.02m}SiMe_2OH$, and $HOPhMeSiO(Me_2SiO)_mSiPhMeOH$, where Me and Ph denote methyl and phenyl respectively and the subscript m is as defined above.

Component (A) can be a single organopolysiloxane or a mixture comprising two or more organopolysiloxanes that differ in at least one of the following properties: structure, viscosity, average molecular weight, siloxane units, and sequence.

Methods of preparing organopolysiloxanes suitable for use in the composition of the present invention, such as hydrolysis and condensation of the corresponding organohalosilanes or equilibration of cyclic polydiorganosiloxanes with a chain stopper such as water or a low molecular weight silanol-terminated diorganosiloxane, are well known in the art.

Component (B) of the present invention is a crosslinking agent selected from (i) at least one silane having the formula $R^2_nSiX_{4-n}$ wherein each $R^2$ is independently selected from monovalent hydrocarbon and monovalent halogenated hydrocarbon groups having from 1 to about 8 carbon atoms, n is 0 or 1, and X is $-OR^2$ or $-OCH_2CH_2OR^2$; (ii) a partial hydrolyzate of (i), and (iii) mixtures comprising (i) and (ii). Examples of monovalent hydrocarbon and monovalent halogenated hydrocarbon groups include, but are not limited to, alkyl such as methyl, ethyl, propyl, pentyl, octyl, undecyl, and octadecyl; cycloalkyl such as cylcohexyl; alkenyl such as vinyl and allyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, $R^2$ is alkyl and more preferably, $R^2$ is methyl, ethyl, or propyl.

Examples of silanes having the formula $R^2_nSiX_{4-n}$ wherein $R^2$ and n are defined above include, but are not limited to, silanes having the formulae: $Si(OCH_3)_4$, $Si(OCH_2CH_3)_4$, $Si(OCH_2CH_2CH_3)_4$, $Si[O(CH_2)_3CH_3]_4$, $Si[O(CH_2)_5]_4$, $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_3)_3$, $CH_3CH_2Si(OCH_2CH_3)_3$, $CH_3CH_2Si(OCH_2CH_2CH_3)_3$, $CH_3CH_2CH_2Si(OCH_2CH_3)_3$, $CH_3CH_2CH_2Si(OCH_2CH_2CH_3)_3$, $CH_3(CH_2)_3Si(OCH_3)_3$, $CH_3(CH_2)_3Si(OCH_2CH_3)_3$, $(CH_3)_2CHCH_2Si(OCH_3)_3$, $CH_3(CH_2)_5Si(OCH_3)_3$, $C_6H_{11}Si(OCH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CH_2=C(CH_3)CH_2Si(OCH_3)_3$, $CF_3CH_2CH_2Si(OCH_3)_3$, $Si(OCH_2CH_2OCH_3)_4$, $Si(OCH_2CH_2OC_2H_5)_4$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, and $CH_2=C(CH_3)CH_2Si(OCH_2CH_2OCH_3)_3$.

Methods of preparing silanes suitable for use in the silicone composition of the present invention, such as the reaction of chlorosilanes with alcohols, are well known in the art.

A partial hydrolyzate of at least one silane having the formula $R^2_nSiX_{4-n}$ wherein $R^2$ and n are defined above is commonly referred to as a "polysilicate." Methods of preparing polysilicates are well known in the art. For example, the partial hydrolyzate can be prepared by partially hydrolyzing the aforementioned silane in the presence of a small amount of an acid to a point where the hydrolyzate is a water-insoluble liquid that can be isolated from the reaction mixture. In particular, the controlled partial hydrolysis of ethyl orthosilicate can be carried out by treating a mixture of the orthosilicate in water with an acid or an acid-forming metal salt to obtain a two-phase mixture and then separating the water-insoluble, partially hydrolyzed orthosilicate from the aqueous phase. Examples of acid-forming metal salts include, but are not limited to, ferric chloride, cupric chloride, aluminum chloride, and stannic chloride.

Component (B)(i) can be a single silane or a mixture comprising two or more different silanes. Similarly, component (B)(ii) can be a partial hydrolyzate of one silane or a mixture comprising two or more different silanes. Finally, component (B) can be a crosslinking agent as defined by (B)(i) or (B)(ii) or a mixture comprising (B)(i) and (B)(ii).

The concentration of component (B) in the silicone composition of the present invention is sufficient to cure (crosslink) the composition. The exact amount of component (B) depends on the desired extent of cure, which generally increases as the ratio of the number of moles of silicon-bonded $-OR^2$ or $-OCH_2CH_2OR^2$ groups in component (B) to the number of moles of hydroxy groups in component (A) increases. Typically, the concentration of component (B) is sufficient to provide from 0.8 to 10 silicon-bonded $-OR^2$ or $-OCH_2CH_2OR^2$ groups per hydroxy group in component (A). Preferably, the concentration of component (B) is sufficient to provide from 1.0 to 3.0 silicon-bonded $-OR^2$ or $-OCH_2CH_2OR^2$ groups per hydroxy group in component (A).

Component (C) of the present invention is at least one electrically conductive filler comprising particles having at least an outer surface of a metal selected from silver, gold, platinum, palladium, and alloys thereof. Fillers comprising particles consisting of silver, gold, platinum, palladium, and alloys thereof typically have the form of a powder or flakes with an average particle size of from 0.5 to 20 $\mu$m. Fillers comprising particles having only an outer surface consisting of silver, gold, platinum, palladium, and alloys thereof typically have an average particle size of from 15 to 100 $\mu$m. The core of such particles can be any material, electrical conductor or insulator, that supports a surface consisting of the aforementioned metal and does not adversely affect the electrical properties of the silicone adhesive. Examples of such materials include, but are not limited to, copper, solid glass, hollow glass, mica, nickel, and ceramic fiber.

In the case of electrically conductive fillers comprising metal particles having the form of flakes, the surface of the particles may be coated with a lubricant, such as a fatty acid or fatty acid ester. Such lubricants are typically introduced during the milling process used to produce flakes from a metal powder to prevent the powder from cold welding or forming large aggregates. Even when the flakes are washed with a solvent after milling, some lubricant may remain chemisorbed on the surface of the metal.

The electrically conductive filler of the present invention also includes fillers prepared by treating the surfaces of the aforementioned particles with at least one organosilicon compound. Suitable organosilicon compounds include those typically used to treat silica fillers, such as organochlorosilanes, organosiloxane, organodisilazanes, and organoalkoxysilanes.

Component (C) can be a single electrically conductive filler as described above or a mixture of two or more such fillers that differ in at least one of the following properties: composition, surface area, surface treatment, particle size, and particle shape.

Preferably, the electrically conductive filler of the present invention comprises particles consisting of silver and more preferably particles consisting of silver having the form of flakes.

The concentration of component (C) in the silicone composition of the present invention is sufficient to impart electrical conductivity to the adhesive formed by curing the composition. Typically, the concentration of component (C) is such that the silicone adhesive has a contact resistance less than about 1$\Omega$ and a volume resistivity less than about 0.01 $\Omega$·cm, as determined using the methods in the Examples below. The exact concentration of component (C) depends on the desired electrical properties, surface area of the filler, density of the filler, shape of the filler particles, surface treatment of the filler, and nature of the other components in the silicone composition. The concentration of component (C) is typically from about 15 to about 80 percent by volume and preferably from about 20 to about 50 percent by volume, based on the total volume of the silicone composition. When the concentration of component (C) is less than about 15 percent by volume, the silicone adhesive typically does not have significant electrical conductivity. When the concentration of component (C) is greater than about 80 percent by volume, the silicone adhesive typically does not exhibit further substantial improvement in electrical conductivity.

Methods of preparing electrically conductive fillers suitable for use in the silicone composition of the present invention are well known in the art; many of these fillers are commercially available. For example powders of silver, gold, platinum, or palladium, or alloys thereof are typically produced by chemical precipitation, electrolytic deposition, or cementation. Also, flakes of the aforementioned metals are typically produced by grinding or milling the metal powder in the presence of a lubricant, such as a fatty acid or fatty acid ester. Particles having only an outer surface of at least one of the aforementioned metals are typically produced by metallizing an appropriate core material using a method such as electrolytic deposition, electroless deposition, or vacuum deposition.

As stated above, the electrically conductive filler of the present invention can be a filler prepared by treating the surfaces of the aforementioned particles with at least one organosilicon compound. In this case, the particles can be treated prior to admixture with the other ingredients of the silicone composition or the particles can be treated in situ during the preparation of the silicone composition.

Component (D) of the present invention is at least one hydroxy-functional organic compound having a molecular weight up to about 1000 and containing at least one hydroxy group per molecule, provided the compound does not substantially inhibit cure of the composition. When the molecular weight of the hydroxy-functional organic compound is greater than about 1000, the silicone adhesive formed by curing the composition does not have substantially improved electrical conductivity relative to an adhesive formed by curing a similar silicone composition lacking only the hydroxy-functional organic compound. As used herein, the term "substantially inhibit cure" means to prevent cure or retard cure to the point where the cure rate is impracticably slow, for example, several days, at all temperatures from room temperature to about 150° C. Preferably, the silicone composition of the present invention cures in less than about 16 hours at 70° C.

The structure of the hydroxy-functional organic compound can be linear, branched, or cyclic. The hydroxy group(s) in the hydroxy-functional organic compound may be attached to a primary, secondary or tertiary aliphatic carbon atom; an aromatic carbon atom; or a doubly bonded carbon atom in the molecule. Furthermore, there are no restrictions on the stereochemistry of the hydroxy-bearing carbon atom(s) or the molecule.

The hydroxy-functional organic compound can contain one or more functional groups other than hydroxy, provided the compound does not substantially inhibit cure of the composition. Examples of suitable functional groups include, but are not limited to, —O—, >C=O, —CHO, —CO$_2$—, —C≡N, —NO$_2$, >C=C<, —C≡C—, —F, —Cl, —Br, and —I. However, hydroxy-functional organic compounds containing functional groups that strongly complex the metal in the condensation catalyst, component (E), may substantially inhibit cure of the composition. For example, when a tin catalyst is used, hydroxy-functional organic compounds containing thiol (—SH) groups are generally avoided. The degree of inhibition depends on the particular functional group and metal and the mole ratio thereof. The suitability of a particular hydroxy-functional organic compound for use in the silicone composition of the present invention can be readily determined by routine experimentation using the methods in the Examples below.

The hydroxy-functional organic compound can be a naturally occurring or synthetic compound having a liquid or solid state at room temperature. Also, the hydroxy-functional organic compound can be soluble, partially soluble, or insoluble in the silicone composition. The normal boiling point of the hydroxy-functional organic compound, which depends on the molecular weight, structure, and number and nature of functional groups in the compound, can vary over a wide range. Preferably, the hydroxy-functional organic compound has a normal boiling point greater than the cure temperature of the composition. Otherwise, appreciable amounts of the hydroxy-functional organic compound may be removed by volatilization during cure, resulting in little or no enhancement in the conductivity of the silicone adhesive. Also, excessive volatilization of the hydroxy-functional organic compound during curing may cause formation of voids in the silicone adhesive.

Examples of hydroxy-functional compounds suitable for use in the composition of the present invention include, but are not limited to, monohydric alcohols such as methanol, ethanol, propanol, butanol, pentanol, hexanol, cyclohexanol, hepatanol, nonanol, decanol, undecanol, 1-phenylethanol, benzyl alcohol, allyl alcohol, 3-nitrobenzyl alcohol, 3-chlorobenzyl alcohol, 3-bromobenzyl alcohol, 3-iodobenzyl alcohol, and diethylene glycol butyl ether; dihydric alcohols such as ethylene glycol, propylene glycol (1,2-propanediol), polyethylene glycol, polypropylene glycol, polytetrahydrofuran, benzopinacole, 1,2-butanediol, 1,3-butanediol, 1,4-butanediol, trimethylene glycol (1,3-propanediol), 1,5-pentanediol, 1,6-hexanediol, and bis(2-hydroxyethyl) ether; polyhydric alcohols such as glycerol, pentaerythritol, dipentaerythritiol, tripentaerythritol, trimethylolethane, trimethylolpropane, ditrimethylolpropane, 1,3-dihydroxyacetone dimer, sorbitol, and mannitol; phenols such as phenol, 1-hydroxynaphthalene, 1,2-dihydroxynaphthalene, hydroquinone, catechol, resorcinol, phloroglucinol (1,3,5-trihydroxybenzene), p-cresol, vitamin E, 2-nitrophenol, 2,4-dinitrophenol, picric acid (2,4,6-trinitrophenol), 4-chlorophenol, 2-bromophenol, 2-iodophenol, 2,4,5-tricholorophenol, chlorohydroquinone, pentachlorophenol; sugars such as glucose, mannose, allose, altrose, idose, gulose, galactose, talose, ribose, arabinose, xylose, lyxose, erythrose, threose, glyceraldehyde, fructose, ribulose, lactose, maltose, and sucrose; hydroxy aldehydes such as 2-hydroxybutyraldehyde, 4-hydroxybenzaldehyde, and 2,4-dihydroxybenzaldehyde; hydroxy ketones such as hydroxyacetone, 1-hydroxy-2-butanone, 2',4'-dihydroxyacetophenone, benzoin, and 3-hydroxy-2-butanone; hydroxy acids such as citric acid, gluconic acid, 3-hydroxybutyric acid, 2-hydroxycinnamic acid, and salicylic acid (2-hydroxybenzoic acid); and hydroxy esters such as ascorbic acid, TWEEN 20 (polyoxyethylene (20) sorbitan monolaurate), methyl salicylate, methyl 3-hydroxybenzoate, and methyl 2-hydroxyisobutyrate.

Component (D) is present in an effective amount in the silicone composition of the present invention. As used herein, the term "effective amount" means that the concentration of component (D) is such that the silicone composition cures to form a silicone adhesive having improved electrical conductivity, initial contact resistance and/or volume resistivity, compared with a similar silicone composition lacking only the hydroxy-functional organic compound. Typically, the concentration of component (D) is such that the adhesive exhibits at least about a ten-fold improvement in either contact resistance or volume resistivity, as determined using the methods in the Examples below. The concentration of component (D) is typically from about 0.1 to about 3 percent by weight and preferably from about 0.5 to about 1.5 percent by weight, based on the total weight of the composition. When the concentration of component (D) is less than about 0.1 percent by weight, the silicone adhesive typically does not exhibit improved electrical conductivity. When the concentration of component (D) is greater than about 3 percent by weight, the silicone adhesive typically does not exhibit further substantial improvement in electrical conductivity. The effective amount of component (D) can be determined by routine experimentation using the methods in the Examples below.

Methods of preparing hydroxy-functional organic compounds suitable for use in the silicone composition of the present invention are well known in the art; many of these compounds are commercially available.

Component (E) of the present invention is at least one condensation catalyst comprising a metal salt of a carboxylic acid, which promotes the condensation reaction of component (A) with component (B). As used herein, the term "metal salt of a carboxylic acid" includes salts containing hydrocarbon groups attached to the metal. The carboxylate component of the metal salt can be derived from a monocarboxylic acid or a dicarboxylic acid having from 2 to 20 carbon atoms. The metal ion component of the metal salt is typically derived from lead, tin, nickel, cobalt, antimony, iron, cadmium, chromium, zirconium, zinc, manganese, aluminum, and titanium. Preferably, the metal ion in the metal salt is derived from tin, lead, or zinc. Examples of metal salts of carboxylic acids include, but are not limited to, lead naphthenate, cobalt naphthenate, zinc naphthenate, tin naphthenate, lead octoate, tin octoate, zinc octoate, iron stearate, tin oleate, chromium octoate, antimony octoate, tin butyrate, dibutyltin diacetate, dibutyltin dioctoate, dibutyltin dilaurate, dibutyltin adipate, dibutyltin dibenzoate, dibutyltin dilactate, lead sebacate, and zirconium acetylacetonate. The tin and lead salts are particularly preferred because they are generally soluble in the organopolysiloxane, Component (A), and have high catalytic activity.

The concentration of component (E) is sufficient to catalyze the condensation reaction of components (A) and (B). The exact amount of component (E) depends on the desired extent and rate of cure, the activity of the catalyst, the type of crosslinking agent, and the nature of the other components in the silicone composition. The concentration of component (E) is typically from 0.1 to 10 percent by weight and preferably from 0.5 to 5 percent by weight, based on the weight of the organopolysiloxane, component (A).

The silicone composition of the present invention can also comprise additional ingredients, provided the ingredient does not prevent the composition from curing to form an adhesive having improved contact resistance and/or volume resistivity compared with a similar silicone composition lacking only the hydroxy-functional organic compound. Examples of additional ingredients include, but are not limited to, adhesion promoters, solvents, organopolysiloxane resins, precrosslinked silicone elastomer particulates, and non-functional silicone fluids.

The silicone composition of the present invention can further comprise at least one adhesion promoter that effects strong unprimed adhesion of the silicone composition to substrates commonly employed in the construction of electronic devices; for example, silicon; passivation coatings, such as silicon dioxide and silicon nitride; glass; metals, such as copper and gold; ceramics; and organic resins, such as polyimide. The adhesion promoter can be any adhesion promoter typically employed in condensation-curable silicone compositions, provided it does not adversely affect cure of the composition or the physical properties of the silicone adhesive, particularly contact resistance and volume resistivity.

Examples of adhesion promoters suitable for use in the silicone composition of the present invention include, but are not limited to, amino-functional alkoxysilanes such as $H_2N(CH_2)_3Si(OCH_3)_3$, $H_2N(CH_2)_3Si(OCH_2CH_3)_3$, $H_2N(CH_2)_3Si(OCH_2CH_2OCH_3)_3$, $H_2N(CH_2)_4Si(OCH_3)_3$, $H_2NCH_2CH(CH_3)CH_2CH_2SiCH_3(OCH_3)_2$, $H_2N(CH_2)_2NH(CH_2)_3Si(OCH_3)_3$, $H_2N(CH_2)_2NH(CH_2)_3Si(OCH_2CH_2OCH_3)_3$, $CH_3NH(CH_2)_2NH(CH_2)_3Si(OCH_3)_3$, $H_2N(CH_2)_2NH(CH_2)_3Si(CH=CH_2)(OCH_3)_2$; epoxy-functional alkoxysilanes such as 3-glycidox 1,2-epoxy-4-(2-trimethoxysilylethyl)cyclohexane, and 1,2-epoxy-2-methyl-4-(1-methyl-2-trimethoxysilylethyl)cyclohexane; reaction products of at least one amino-functional alkoxysilane and at least one epoxy-functional alkoxysilane such as reaction products of 3-glycidoxypropyltrimethoxysilane and 3-aminopropyltrimethoxysilane, 3-glycidoxypropyltrimethoxysilane and [3-(2-aminoethyl)aminopropyl] trimethoxysilane, 1,2-epoxy-4-(2-trimethoxysilylethyl) cyclohexane and 3-aminopropyltrimethoxysilane, 1,2-epoxy-4-(2-trimethoxysilylethyl)cyclohexane and [3-(2-aminoethyl)aminopropyl]trimethoxysilane, 1,2-epoxy-2-methyl-4-(1-methyl-2-trimethoxysilylethyl)cyclohexane and 3-aminopropyltrimethoxysilane, and 1,2-epoxy-2-methyl-4-(1-methyl-2-trimethoxysilylethyl)cyclohexane and [3-(2-aminoethyl)aminopropyl]trimethoxysilane; and vinyl trialkoxysilanes such as $(CH_3O)_3SiCH=CH_2$, $(CH_3CH_2O)_3SiCH=CH_2$, $(CH_3CH_2CH_2O)_3SiCH=CH_2$, $(CH_3CH_2CH_2CH_2O)_3SiCH=CH_2$, and $(CH_3OCH_2CH_2O)_3SiCH=CH_2$.

The concentration of the adhesion promoter in the composition of the present invention is sufficient to effect adhesion of the composition to a substrate, such as those cited above. The concentration can vary over a wide range depending on the nature of the adhesion promoter, the type of substrate, and the desired adhesive bond strength. The concentration of the adhesion promoter is generally from 0.01 to about 10 percent by weight, based on the total weight composition. However, the optimum concentration of the adhesion promoter can be readily determined by routine experimentation.

Methods of preparing amino-functional alkoxysilanes are well known in the art as exemplified in U.S. Pat. No. 3,888,815 to Bessmer et al. Methods of preparing epoxy-functional alkoxysilanes, such as the hydrosilylation addition reaction of alkenyl-containing epoxysilanes with trialkoxysilanes, and methods of preparing vinyl trialkoxysilanes, such as the reaction of vinyltrichlorosilane with alcohols, are also well known in the art. Reaction products of amino-functional alkoxysilanes and epoxy-functional alkoxysilanes can be prepared using well known methods of reacting epoxy-containing compounds with amines. The reaction is typically carried out using about a 1:1 mole ratio of epoxy groups in the epoxy-functional alkoxysilane to nitrogen-bonded hydrogen atoms in the amino-functional alkoxysilane. The two compounds can be reacted either in the presence of an inert organic solvent, such as toluene, or in the absence of a diluent. The reaction can be carried out at room temperature or an elevated temperature, for example, from about 50 to about 100° C.

The silicone composition of the present invention can further comprise an appropriate quantity of a solvent to lower the viscosity of the composition and facilitate the preparation, handling, and application of the composition. Preferably, the solvent has a normal boiling point greater than the cure temperature of the composition. Otherwise excessive volatilization of the solvent during curing may cause formation of voids in the silicone adhesive. Examples of suitable solvents include, but are not limited to, saturated hydrocarbons having from 1 to about 20 carbon atoms; aromatic hydrocarbons such as xylenes; mineral spirits; halohydrocarbons; esters; ketones; silicone fluids such as linear, branched, and cyclic polydimethylsiloxanes; and mixtures of such solvents. The optimum concentration of a particular solvent in the present silicone composition can be readily determined by routine experimentation.

The silicone composition of the present invention can also comprise at least one organopolysiloxane resin consisting essentially of $R^3_3SiO_{1/2}$ siloxane units and $SiO_{4/2}$ siloxane units wherein each $R^3$ is independently selected from monovalent hydrocarbon and monovalent halogenated hydrocarbon groups having from 1 to 20 carbon atoms and the mole ratio of $R^3_3SiO_{1/2}$ units to $SiO_{4/2}$ units in the organopolysiloxane resin is from 0.65 to 1.9.

When the silicone composition further comprises an organopolysiloxane resin, the concentration of the crosslinking agent is typically sufficient to provide from 0.8 to 10 silicon-bonded $—OR^2$ or $—OCH_2CH_2OR^2$ groups and preferably from 1 to 3 silicon-bonded $—OR^2$ or $—OCH_2CH_2OR^2$ groups, per silicon-bonded hydroxy group in component (A) and the organopolysiloxane resin combined.

The concentration of the organopolysiloxane resin in the silicone composition of the present invention is typically from 5 to 90 parts by weight per 100 parts by weight of component (A) and the resin combined.

The organopolysiloxane resin of the present invention can be prepared by well known methods in the art as exemplified in U.S. Pat. No. 2,676,182 to Daudt et al.

The silicone composition of the present invention can further comprise at least one precrosslinked silicone elastomer particulate. The silicone particulate provides the cured composition with good elasticity, low hardness, and a low permanent compression set.

The particulate is a powder of a precrosslinked silicone elastomer consisting of spherical or irregularly shaped particles. The particles typically have an average particle size of from 0.1 to 500 μm and preferably have an average particle size of from 0.5 to 300 μm.

The concentration of the precrosslinked silicone elastomer particulate in the silicone composition of the present invention is typically from 10 to 150 parts by weight and is preferably from 15 to 80 parts by weight, per 100 parts by weight of components (A) and (B) combined.

Several methods of preparing precrosslinked silicone elastomer particulates are known in the art, including spray drying and curing a curable organopolysiloxane composition as disclosed in Japanese Patent Application No. 59-96122; spray drying an aqueous emulsion containing a curable organopolysiloxane composition as disclosed in U.S. Pat. No. 4,761,454; curing an emulsion of a liquid silicone rubber microsuspension as disclosed in U.S. Pat. No. 5,371,139; and pulverizing a precrosslinked silicone elastomer.

The composition of the present invention can also comprise at least one non-functional silicone fluid. As used herein, the term "non-functional" means that the silicone fluid is free of functional groups that react with components (A), (B), or (D) under normal cure conditions. The silicone fluid can be used to alter the viscosity of the present silicone composition, depending on the requirements for a particular application. Moreover, the silicone fluid reduces the cost of the silicone composition. The structure of the silicone fluid is typically linear, branched, or cyclic, preferably linear or branched, and more preferably linear. Also, the silicone fluid typically has a viscosity at 25° C. of from about 0.05 to about 200 Pa·s and preferably has a viscosity of from about 2 to about 100 Pa·s.

Examples of silicone fluids suitable for use in the composition of the present invention include, but are not limited to linear silicone fluids such as the trimethylsiloxy-terminated dimethylsiloxane fluids sold by Dow Corning Corporation under the trade name "Dow Corning® 200

Fluids" and branched silicone fluids such as Me$_3$SiO[(OSiMe$_3$)$_2$SiO]SiMe$_3$ and Me$_3$SiO[(OSiMe$_3$)MeSiO]SiMe$_3$.

The concentration of the non-functional silicone fluid in the composition of the present invention is typically up to about 20 parts by weight, preferably from about 5 to 15 parts by weight, per 100 parts by weight of component (A). The optimum concentration of the non-functional silicone fluid for a particular application can be readily determined by routine experimentation.

The silicone composition of the present invention can be a one-part composition comprising components (A) through (E) in a single part or, alternatively, a multi-part composition comprising components (A) through (E) in two or more parts, provided neither component (A) nor component (D), are present with components (B) and (E) in the same part. For example, a multi-part silicone composition can comprise a first part containing all of component (A), a portion of component (C), all of component (D), and a second part containing the remaining portion of component (C), and all of components (B) and (E).

The one-part silicone composition of the instant invention is typically prepared by combining components (A) through (E) and any optional ingredients in the stated proportions at ambient temperature with or without the aid of a solvent, which is described above. Although the order of addition of the various components is not critical if the silicone composition is to be used immediately, the condensation catalyst is preferably added last at a temperature below about 30° C. to prevent premature curing of the composition. Also, the multi-part silicone composition of the present invention can be prepared by combining the particular components designated for each part. Mixing can be accomplished by any of the techniques known in the art such as milling, blending, and stirring, either in a batch or continuous process. The particular device is determined by the viscosity of the components and the viscosity of the final silicone composition.

The silicone composition of the present invention can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; polyesters; ceramics; and glass. Furthermore, the silicone composition of the instant invention can be applied to a substrate by any suitable means such as spraying, syringe dispensing, screen or stencil printing, or ink jet printing.

A silicone adhesive according to the present invention comprises a reaction product of the silicone composition containing components (A) through (E), described above. The silicone composition of this invention can be cured at a temperature from about room temperature to about 150° C., preferably from about 40 to about 100° C., and more preferably from about 50 to about 80° C., for a suitable length of time. For example, the present silicone composition can be cured in about 10 to 20 hours at room temperature and in less than about 16 hours at 70° C.

The silicone composition of the present invention has numerous advantages, including good flow, low VOC (volatile organic compound) content, and adjustable cure. Moreover, the present silicone composition cures to form a silicone adhesive having good adhesion and unexpectedly superior electrical properties.

With regard to flow, the present silicone composition possesses the rheological properties required for a number of applications and is easily dispensed and applied using standard equipment.

Furthermore, absent optional solvent, the silicone composition of the present invention has a very low VOC content. Consequently, the composition avoids the health, safety, and environmental hazards associated with solvent-borne silicone compositions. In addition, the solventless composition of the present invention typically undergoes less shrinkage during curing than solvent-borne silicone compositions.

The silicone composition of the present invention cures rapidly at moderately elevated temperatures. Moreover, the cure rate of the silicone composition can be conveniently adjusted by regulating the type and amount of both the catalyst and crosslinking agent and the cure temperature.

Further, the silicone composition of the present invention cures to form a silicone adhesive having good adhesion to a wide variety of materials, including metals, glass, silicon, silicon dioxide, ceramics, polyesters, and polyimides.

Importantly, the silicone composition of the present invention cures to form a silicone adhesive having unexpectedly improved electrical conductivity, as evidenced by a low initial contact resistance and/or volume resistivity, compared with a similar silicone composition lacking only the hydroxy-functional organic compound.

The silicone composition of the present invention is useful for preparing an electrically conductive silicone adhesive. The silicone adhesive of the present invention has numerous uses, including die attach adhesives, solder replacements, and electrically conductive coatings and gaskets. In particular, the silicone adhesive is useful for bonding electronic components to flexible or rigid substrates.

EXAMPLES

The following examples are presented to further illustrate the silicone composition of this invention, but are not to be considered as limiting the invention, which is delineated in the appended claims. Unless otherwise noted, all parts and percentages reported in the examples are by weight. The following methods and materials were employed in the examples:

The Contact resistance of a silicone adhesive on copper was determined using a Keithley Instruments Model 580 Micro-ohm Meter equipped with a 4-pole probe having spring-loaded, gold-plated, chisel point tips. A contact resistance joint was prepared by bonding two rectangular copper bars (0.254 cm×0.254 cm×2.032 cm) with the silicone composition according to the following procedure: One face (rectangular) of each copper bar was cleaned by sanding with 400 grit silicon carbide waterproof sandpaper, scrubbing with a Kimwipe dampened with heptane followed by a Kimwipe dampened with isopropanol, and air drying at room temperature for at least one hour. A small aliquot of the silicone composition was applied at approximately the center (lengthwise) of one bar. A second bar was then oriented perpendicular to the first bar with the center (lengthwise) of each bar facing the other and the silicone composition forming a bondline of 0.025 cm. Finally, the cross-shaped (+) fixture was cured in a forced air oven at 70° C. for sixteen hours. After allowing the sample to cool to room temperature, the initial contact resistance of the joint was measured. The reported values for contact resistance, expressed in units of ohms, represent the average of three measurements, each performed on identically prepared test specimens.

The volume resistivity of a silicone adhesive was determined using a Keithley Instruments Model 580 Micro-ohm Meter equipped with a four-point probe having spring-loaded, gold-plated, spherical tips. A test specimen was prepared by first placing two strips of 3M Scotch brand tape 0.25 cm apart on a glass microscope slide to form a channel extending the length of the slide. An aliquot of the silicone composition was deposited at one end of the slide and over the channel. The composition was then spread over the entire channel by drawing a razor blade through the composition and across the surface at an angle of 45°. The tape strips were removed and the specimen was cured in a forced air oven at 70° C. for sixteen hours. After allowing the sample to cool to room temperature, the voltage drop between the two inner probe tips was measured at an appropriate current to give a resistance value in ohms. The initial volume resistivity of the adhesive was then calculated using the following equation:

$$V=R(W \times T/L)$$

where V is volume resistivity in ohm-centimeters, R is resistance (ohms) of the adhesive measured between two inner probe tips spaced 2.54 cm apart, W is the width of the adhesive layer in centimeters, T is the thickness of the adhesive layer in centimeters, and L is the length of the adhesive layer between the inner probes in centimeters (2.54 cm). The thickness of the adhesive layer, typically about 0.004 cm, was determined using an Ames Model LG3500-0-04 thickness gauge. The reported values for volume resistivity, expressed in units of ohm-centimeters, represent the average of three measurements, each performed on an identically prepared test specimen.

Silicone Base: a mixture consisting of 12% of a hydroxy-terminated polydimethylsiloxane having a viscosity of about 50,000 mm$^2$/s; 22% of a hydroxy-terminated polydimethylsiloxane having a viscosity of about 10,000 mm$^2$/s; 0.8% of a trimethylsiloxy-terminated polydimethylsiloxane having a viscosity of about 350 mm$^2$/s; 35% of a trimethylsiloxy-terminated polydimethylsiloxane having a viscosity of about 325 mm$^2$/s; 23% of a hexamethyldisilazne-treated precipitated silica; 6% of zirconium silicate (ZrSiO$_4$) having a particle size of 5 μm; and 0.6% of water. terminated Curing Agent: a mixture consisting of 80% of a trimethylsiloxy-terminated polydimethylsiloxane having a viscosity of about 50 mm$^2$/s, 11% of ethyl polysilicate, 6% of phenyltrimethoxysilane, 2% of tetraethyl orthosilicate, and 1% of dibutyltin dilaurate.

Adhesion Promoter: a mixture consisting of 98% of a reaction product of 3-glycidoxypropyltrimethoxysilane and 3-aminopropyltrimethoxysilane, and 2% methanol. The reaction product was prepared by reacting 3 parts of 3-glycidoxypropyltrimethoxysilane with 1 part of 3-aminopropyltrimethoxysilane at 50° C. for 10 hours.

Filler: a silver flake sold under the name SF-22 by Degussa Corporation. The filler has a tap density of 3.5 g/cm$^3$; a surface area of 1.07 m$^2$/g; weight loss of 0.05% at 110° C.; weight loss of 0.45% at 538° C.; and a particle size distribution of 9.71 μm (95%), 7.5 μm (90%), 3.0 μm (50%), and 1.0 μm (10%).

TERGITOL TMN-6: a nonionic surfactant commercially available from Union Carbide Corporation. The surfactant consists of 87% of 2,6,8-trimethyl-4-nonyloxypolyethyleneoxyethanol (reaction product of 2,6,8-trimethyl-4-nonanol and ethylene oxide), 10% of water, 2% of polyethylene glycol, and 1% of 2,6,8-trimethyl-4-nonanol.

Comparative Example 1

A silicone composition was prepared by first mixing 18.00 parts of Silicone Base, 1.82 parts of Curing Agent, and 0.23 part of Adhesion Promoter in a 1 oz. plastic cup. The components were then mixed for 26 seconds using an AM 501 Hauschild dental mixer. Then 79.95 parts of Filler was added to the mixture and the components were blended for 26 seconds. The mixture was cooled to room temperature by immersing the cup in a water bath and the aforementioned mixing and cooling procedure was repeated. The contact resistance (copper) and volume resistivity of the cured silicone adhesive are shown in Table 1.

Examples 1–3

In each of Examples 1–4, a silicone composition was prepared by combining the hydroxy-functional organic compound specified in Table 1 with a sample of the silicone composition prepared in Comparative Example 1, according to the following procedure: In a ¼ oz. plastic cup, 0.04 part (1%) of the hydroxy-functional organic compound was added to 4.00 parts of the silicone composition in Comparative Example 1. The components were mixed for 26 seconds using an AM 501 Hauschild dental mixer. The mixture was then cooled to room temperature and the aforementioned mixing and cooling procedure was repeated. The contact resistance (copper) and volume resistivity values of the cured silicone adhesives are shown in Table 1.

TABLE 1

| Example | Hydroxy-Functional Organic Compound | Contact Resistance (Ω) | Volume Resistivity (Ω·cm) |
|---|---|---|---|
| Comp. 1 | — | 4.03 | $2.03 \times 10^{-2}$ |
| 1 | glycerol | $7.83 \times 10^{-4}$ | $4.35 \times 10^{-4}$ |
| 2 | Tergitol TMN-6 | 4.01 | $2.18 \times 10^{-3}$ |
| 3 | vitamin E | $2.03 \times 10^{2}$ | $8.52 \times 10^{-4}$ |
| 4 | 1,3-dihydroxyacetone dimer | $2.90 \times 10^{-2}$ | $1.75 \times 10^{-1}$ |

That which is claimed is:

1. A curable silicone composition for preparing a silicone adhesive, the composition prepared by mixing:
   (A) an organopolysiloxane containing an average of at least two silicon-bonded hydroxy groups per molecule;
   (B) a crosslinking agent in an amount sufficient to cure the composition; wherein the agent is selected from (i) at least one silane having the formula $R^2_n SiX_{4-n}$ wherein each $R^2$ is independently selected from monovalent hydrocarbon and monovalent halogenated hydrocarbon groups having from 1 to about 8 carbon atoms, n is 0 or 1, and X is —OR$^2$ or —OCH$_2$CH$_2$OR$^2$; (ii) a partial hydrolyzate of (i), and (iii) mixtures comprising (i) and (ii);
   (C) an electrically conductive filler in an amount sufficient to impart electrical conductivity to the silicone adhesive, wherein the filler comprises particles consisting of silver, gold, platinum, palladium, or alloys thereof;
   (D) an effective amount of a hydroxy-functional organic compound having a molecular weight up to about 1000 and containing at least one hydroxy group per molecule, provided the compound does not substantially inhibit cure of the composition; and
   (E) a catalytic amount of a condensation catalyst comprising a metal salt of a carboxylic acid.

2. The silicone composition according to claim 1, wherein the organopolysiloxane is a hydroxy-terminated polydiorganosiloxane having the general formula HOR$^1_2$SiO(R$^1_2$SiO)$_m$SiR$^1_2$OH wherein each R$^1$ is independently selected from monovalent hydrocarbon and monovalent halogenated hydrocarbon groups and m has a value such that the viscosity of the polydiorganosiloxane at 25° C. is from 0.05 to 200 Pa·s.

3. The silicone composition according to claim 1, wherein $R^2$ in the crosslinking agent is selected from methyl, ethyl, and propyl.

4. The silicone composition according to claim 1, wherein the concentration of the crosslinking agent is sufficient to provide from 1.0 to 3.0 silicon-bonded —$OR^2$ or —$OCH_2CH_2OR^2$ groups per hydroxy group in component (A).

5. The silicone composition according to claim 1, wherein the particles consist of silver.

6. The silicone composition according to claim 1, wherein the filler has a concentration from about 20 to about 50 percent by volume, based on the total volume of the composition.

7. The silicone composition according to claim 1, wherein the composition cures at a temperature of from about room temperature to about 150° C.

8. The silicone composition according to claim 7, wherein the hydroxy-functional organic compound has a normal boiling point greater than the cure temperature of the composition.

9. The silicone composition according to claim 1, wherein the hydroxy-functional organic compound is selected from at least one monohydric alcohol, at least one dihydric alcohol, at least one polyhydric alcohol, at least one phenol, at least one sugar, at least one hydroxy aldehyde, at least one hydroxy ketone, at least one hydroxy acid, at least one hydroxy ester, and a mixture comprising at least two of the aforementioned compounds.

10. The silicone composition according to claim 9, wherein the hydroxy-functional organic compound is selected from at least one monohydric alcohol, at least one dihydric alcohol, at least one polyhydric alcohol, and a mixture comprising at least two of the aforementioned compounds.

11. The silicone composition according to claim 1, wherein the concentration of component (D) is from 0.5 to 1.5 percent by weight, based on the total weight of the composition.

12. The silicone composition according to claim 1, wherein the condensation catalyst comprises a metal salt of a carboxylic acid selected from a tin salt, a lead salt, and a zinc salt.

13. The silicone composition according to claim 1, further comprising a nonfunctional silicone fluid.

14. A silicone adhesive comprising a reaction product of the composition of claim 1.

15. A silicone adhesive comprising a reaction product of the composition of claim 5.

16. The composition of claim 1, wherein component (D) is selected from glycerol; vitamin E; 1,3-dihydroxyacetone dimer; and a nonionic surfactant comprising 2,6,8-trimethyl-4-nonyloxypolyethyleneoxyethanol, polyethylene glycol, and 2,6,8-trimethyl-4-nonanol.

17. A multi-part curable silicone composition for preparing a silicone adhesive, the composition comprising:

(A) an organopolysiloxane containing an average of at least two silicon-bonded hydroxy groups per molecule;

(B) a crosslinking agent in an amount sufficient to cure the composition; wherein the agent is selected from (i) at least one silane having the formula $R^2{}_nSiX_{4-n}$ wherein each $R^2$ is independently selected from monovalent hydrocarbon and monovalent halogenated hydrocarbon groups having from 1 to about 8 carbon atoms, n is 0 or 1, and X is —$OR^2$ or —$OCH_2CH_2OR^2$; (ii) a partial hydrolyzate of (i), and (iii) mixtures comprising (i) and (ii);

(C) an electrically conductive filler in an amount sufficient to impart electrical conductivity to the silicone adhesive, wherein the filler comprises particles consisting of silver, gold, platinum, palladium, and alloys thereof;

(D) an effective amount of a hydroxy-functional organic compound having a molecular weight up to about 1000 and containing at least one hydroxy group per molecule, provided the compound does not substantially inhibit cure of the composition; and (E) a catalytic amount of a condensation catalyst comprising a metal salt of a carboxylic acid, provided neither component (A) nor component (D) are present with components (B) and (E) in the same part.

18. The composition of claim 17, wherein component (D) is selected from glycerol; vitamin E; 1,3-dihydroxyacetone dimer; and a nonionic surfactant comprising 2,6,8-trimethyl-4-nonyloxypolyethyleneoxyethanol, polyethylene glycol, and 2,6,8-trimethyl-4-nonanol.

19. A multi-part curable silicone composition for preparing a silicone adhesive, the composition comprising:

(A) an organopolysiloxane containing an average of at least two silicon-bonded hydroxy groups per molecule;

(B) a crosslinking agent in an amount sufficient to cure the composition; wherein the agent is selected from (i) at least one silane having the formula $R^2{}_nSiX_{4-n}$ wherein each $R^2$ is independently selected from monovalent hydrocarbon and monovalent halogenated hydrocarbon groups having from 1 to about 8 carbon atoms, n is 0 or 1, and X is —$OR^2$ or —$OCH_2CH_2OR^2$; (ii) a partial hydrolyzate of (i), and (iii) mixtures comprising (i) and (ii);

(C) an electrically conductive filler in an amount sufficient to impart electrical conductivity to the silicone adhesive, wherein the filler comprises particles having at least an outer surface of a metal selected from the group consisting of silver, gold, platinum, palladium, and alloys thereof;

(D) an effective amount of a hydroxy-functional organic compound having a molecular weight up to about 1000 and containing at least one hydroxy group per molecule, provided the compound does not substantially inhibit cure of the composition;

(E) a catalytic amount of a condensation catalyst comprising a metal salt of a carboxylic acid, provided neither component (A) nor component (D) are present with components (B) and (E) in the same part; and (F) at least one component selected from (i) an adhesion promoter selected from at least one amino-functional alkoxysilane, at least one epoxy-functional alkoxysilane, a reaction product of at least one amino-functional alkoxysilane and at least one epoxy-functional alkoxysilane, and at least one vinyl trialkoxysilane, (ii) at least one organopolysiloxane resin consisting essentially of $R^3{}_3SiO_{1/2}$ siloxane units and $SiO_{4/2}$ siloxane units wherein each $R^3$ is independently selected from monovalent hydrocarbon and monovalent halogenated hydrocarbon groups having from 1 to 20 carbon atoms and the mole ratio of $R^3{}_3SiO_{1/2}$ units to $SiO_{4/2}$ units is from 0.65 to 1.9, or (iii) a precrosslinked silicone elastomer particulate.

20. The silicone composition according to claim 15, wherein the organopolysiloxane is a hydroxy-terminated polydiorganosiloxane having the general formula $HOR^1{}_2SiO(R^1{}_2SiO)_mSiR^1{}_2OH$ wherein each $R^1$ is independently selected from monovalent hydrocarbon and monovalent halogenated hydrocarbon groups and m has a value such that the viscosity of the polydiorganosiloxane at 25° C. is from 0.05 to 200 Pa·s.

21. The silicone composition according to claim 15, wherein $R^2$ in the crosslinking agent is selected from methyl, ethyl, and propyl.

22. The silicone composition according to claim 15, wherein the concentration of the crosslinking agent is sufficient to provide from 1.0 to 3.0 silicon-bonded —$OR^2$ or —$OCH_2CH_2OR^2$ groups per hydroxy group in component (A).

23. The silicone composition according to claim 15, wherein the particles consist of silver.

24. The silicone composition according to claim 15, wherein the filler has a concentration from about 20 to about 50 percent by volume, based on the total volume of the composition.

25. The silicone composition according to claim 15, wherein the composition cures at a temperature of from about room temperature to about 150° C.

26. The silicone composition according to claim 15, wherein the hydroxy-functional organic compound has a normal boiling point greater than the cure temperature of the composition.

27. The silicone composition according to claim 15, wherein the hydroxy-functional organic compound is selected from at least one monohydric alcohol, at least one dihydric alcohol, at least one polyhydric alcohol, at least one phenol, at least one sugar, at least one hydroxy aldehyde, at least one hydroxy ketone, at least one hydroxy acid, at least one hydroxy ester, and a mixture comprising at least two of the aforementioned compounds.

28. The silicone composition according to claim 27, wherein the hydroxy-functional organic compound is selected from at least one monohydric alcohol, at least one dihydric alcohol, at least one polyhydric alcohol, and a mixture comprising at least two of the aforementioned compounds.

29. The silicone composition according to claim 15, wherein the concentration of component (D) is from 0.5 to 1.5 percent by weight, based on the total weight of the composition.

30. The silicone composition according to claim 15, wherein the condensation catalyst comprises a metal salt of a carboxylic acid selected from a tin salt, a lead salt, and a zinc salt.

31. The silicone composition according to claim 15, further comprising a nonfunctional silicone fluid.

32. A silicone adhesive comprising a reaction product of the composition of claim 15.

33. A silicone adhesive comprising a reaction product of the composition of claim 16.

34. The composition of claim 15, wherein component (D) is selected from glycerol; vitamin E; 1,3-dihydroxyacetone dimer; and a nonionic surfactant comprising 2,6,8-trimethyl-4-nonyloxypolyethyleneoxyethanol, polyethylene glycol, and 2,6,8-trimethyl-4-nonanol.

35. The silicone composition according to claim 7, further comprising a solvent having a normal boiling point greater than the cure temperature of the composition.

36. A curable silicone composition for preparing a silicone adhesive, the composition prepared by mixing:

(A) an organopolysiloxane containing an average of at least two silicon-bonded hydroxy groups per molecule;

(B) a crosslinking agent in an amount sufficient to cure the composition; wherein the agent is selected from (i) at least one silane having the formula $R^2_n SiX_{4-n}$ wherein each $R^2$ is independently selected from monovalent hydrocarbon and monovalent halogenated hydrocarbon groups having from 1 to about 8 carbon atoms, n is 0 or 1, and X is —$OR^2$ or —$OCH_2CH_2OR^2$; (ii) a partial hydrolyzate of (i), and (iii) mixtures comprising (i) and (ii);

(C) an electrically conductive filler in an amount sufficient to impart electrical conductivity to the silicone adhesive, wherein the filler comprises particles having at least an outer surface of a metal selected from the group consisting of silver, gold, platinum, palladium, and alloys thereof;

(D) an effective amount of a hydroxy-functional organic compound having a molecular weight up to about 1000 and containing at least one hydroxy group per molecule, provided the compound does not substantially inhibit cure of the composition;

(E) a catalytic amount of a condensation catalyst comprising a metal salt of a carboxylic acid; and (F) at least one component selected from (i) an adhesion promoter selected from at least one amino-functional alkoxysilane, at least one epoxy-functional alkoxysilane, a reaction product of at least one amino-functional alkoxysilane and at least one epoxy-functional alkoxysilane, and at least one vinyl trialkoxysilane, (ii) at least one organopolysiloxane resin consisting essentially of $R^3_3SiO_{1/2}$ siloxane units and $SiO_{4/2}$ siloxane units wherein each $R^3$ is independently selected from monovalent hydrocarbon and monovalent halogenated hydrocarbon groups having from 1 to 20 carbon atoms and the mole ratio of $R^3_3SiO_{1/2}$ units to $SiO_{4/2}$ units is from 0.65 to 1.9, or (iii) a precrosslinked silicone elastomer particulate.

* * * * *